3,022,137
COMBUSTION OF TITANIUM TETRACHLORIDE WITH OXYGEN

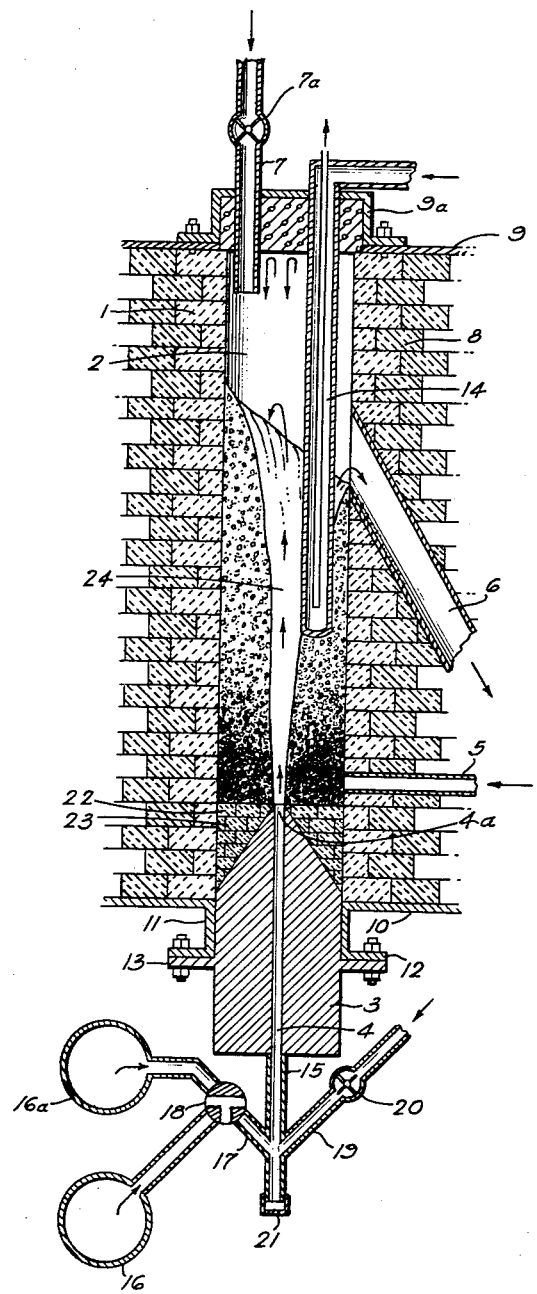

Earl W. Nelson, Lynchburg, Va., assignor to American Cyanamid Company, New York, N.Y., a corporation of Maine
Filed Mar. 26, 1959, Ser. No. 802,181
10 Claims. (Cl. 23—202)

The present invention relates to the manufacture of titanium dioxide. More particularly, the invention relates to the manufacture of titanium dioxide pigment by combustion of titanium tetrachloride with oxygen largely out of contact with fixed (i.e., stationary) surfaces.

It has long been known that titanium dioxide pigment can be produced by burning titanium tetrachloride with oxygen. The combustion proceeds at temperatures at which titanium dioxide is plastic or adhesive. In the process, incrustations of titanium dioxide rapidly build up on the walls of the reactor ultimately causing plugging; cf. Muskat U.S. Patent No. 2,240,343 (1941), Kraus et al. U.S. Patent No. 2,619,434 (1952), Nutting U.S. Patent No. 2,670,272 (1954), Olson et al. U.S. Patent No. 2,670,275 (1954), Nelson et al. U.S. Patent No. 2,750,260 (1956), and Schaumann U.S. Patent No. 2,805,921 (1957), and this is one of the principal disadvantages of the process.

The present invention is based on the discovery that formation of titanium dioxide incrustations can be largely prevented by burning the titanium tetrachloride and oxygen combustion mixture substantially vertically upwardly as a jet stream through a reaction zone bounded by a wall of downwardly cascading oversized incandescent particles. The jet entrains the particles from the wall of the reaction zone and is thus uniformly ignited. The gas largely burns as it rises through the zone which is surrounded by downwardly cascading particles and thus titanium dioxide pigment is formed substantially out of contact with any fixed surface.

As a result, the incrustations which would otherwise develop on the fixed walls form instead on the moving oversized titanium dioxide particles so that the need to scrape or otherwise remove deposits from the fixed walls is largely obviated. The titanium dioxide deposited on the particles is removed by discharging oversized particles from the reactor, classifying them, and returning an appropriate amount of smaller particles to maintain the size and volume of the oversize particles in the reactor substantially constant. The rejected fraction may be chlorinated to supply additional titanium tetrachloride for the process. By means of this process we have found it possible to manufacture titanium dioxide pigment of very satisfactory pigmentary quality while apparently substantially completely preventing formation of deposits or incrustations of titanium dioxide over the inner surface of the reactor.

The present invention will be more particularly explained by reference to the drawing, which is a vertical section (partly schematic) through the center line of one form of apparatus in which it may be carried out.

The apparatus consists essentially of hard-glazed firebrick 1 laid up to define cylindrical reaction space 2, aluminum base plug 3, containing gas supply channel 4 existing at orifice 4a, auxiliary heating gas inlet 5 provided with exterior shut-off valve (not shown), vent pipe 6 for discharge of combustion products and oversized particles to a product recovery system (not shown), and upper inlet pipe 7 containing star feeder 7a for admission of oversized titanium dioxide particles. Firebrick 1 is encased in sufficient insulating brick 8 to minimize heat losses, and the whole is contained in steel cylindrical casing (not shown) closed at the top with steel disc 9 carrying removable cement-filled steel cap 9a and at the bottom with steel disc 10 carrying collar 11 and flange 12. Reaction space 2 optionally contains liquid supplied cooling rod 14. Combustion gas is delivered to the reactor through conduit 4 in base plug 3 from conduit 15 which is connected to main 16 containing a titanium tetrachloride-oxygen combustion gas mixture and main 16a supplying a variable mixture of oxygen and nitrogen by riser 17 containing three-way valve 18. Conduit 19 provided with gas-tight star feed 20 leads into conduit 15 and permits titanium dioxide or other inert refractory oversized particles to be admitted to the gas stream. The lower extremity of conduit 15 is closed by removable gas-tight cap 21 which permits any solids in pipe 15 to be removed conveniently. Base plug 3 is protected against intense heat by cement-laid firebrick 22 and insulating brick 23.

The apparatus is prepared for operation by charging sufficient titanium dioxide particles through star feeder 7a to form a bed about 12" deep, turning three-way valve 18 so as to admit a suitable oxygen-nitrogen mixture from oxygen-nitrogen main 16a, supplying carbon monoxide through line 5, and igniting the gaseous mixture by a torch passed up pipe 6 through a port therein (not shown).

Heating is continued until the temperature of the reactor reaches normal working level, about 1200° C. The feed to the lower orifice is then switched to a combustion mixture consisting substantially of titanium tetrachloride and oxygen, and supply of carbon monoxide is adjusted or cut off. A cold fluid, for example titanium tetrachloride, may be circulated through the cooling rod to remove any excess heat. The jet stream speed is varied. The particles thus swept from the reactor being turned as shown below. The jet entering through orifice 4a blows particles upwardly from the central part of the reactor leaving central zone 24 where the titanium tetrachloride and oxygen substantially completely react. In addition the jet being turbulent entrains incandescent oversized particles from the bottom and lower portions of the crater which is thus formed. The jet stream expands and consequently slows as it rises and the gas speed is adjusted so that the cascading wall is at least sufficiently high to surround the zone of reaction. Preferably a higher gas speed is used so that at least some of the oversized particles have sufficient velocity to scour the end of the reactor and prevent adhesion of titanium dioxide there as well.

Entrainment of oversized particles by the jet stream carries the temperature of the gas through the nucleation range (roughly 750°–800° C.) and uniformly ignites the gas. This heating effect is supplemented by the heat radiated from the crater walls and the upper part of the reactor. Combustion of the gaseous mixture proceeds rapidly, the temperature of the mixture rising to 1100°–1400° C. within a few inches of orifice 4a, the combustion products (chiefly titanium dioxide and chlorine) leave the reactor at low speed and high temperature.

Calculations based on the cross-section area of the effective reaction space as shown in the drawing at various levels based on an actual inlet gas velocity of 170 ft./sec. at 300° C. indicate that the velocity of the jet stream increases slightly as the stream passes through the lower part of the reactor and then decreases as the diameter of the crater increases, the speed of the gaseous stream dropping to between about 3 and 4 ft. per second at the level of the discharge orifice. Temperature measurements using thermocouples embedded in the wall of the reactor indicate that most if not all of the titanium tetrachloride reacts within about 8″–12″ of the inlet orifice.

In the drawing, the downwardly moving particles which are sufficiently closely compacted to form a cascading wall (and the closely compacted static particles at the bottom) are shown by outline; the upwardly moving particles and the downwardly moving particles wholly or largely in gaseous suspension are represented by arrows. The arrows formed of dots represent particle paths which may but need not occur according to the present invention.

Formation of cascading walls is facilitated by having the diameter of the reactor large in comparison with the diameter of the inlet orifice. Our work to date indicates that the ratio of the cross-section area of the reactor to the cross-section area of the inlet orifice should be at least about 10:1 and preferably in excess of 15:1, as this permits formation of a higher and thicker cascading wall. The volume of oversized particles in the reactor should be sufficient to permit formation of a cascading wall around substantially the entire zone where combustion of the titanium tetrachloride takes place. The wall may be higher without apparent disadvantage, but so far we have not found a wall height of more than 25″ to be necessary. The minimum effective height of wall for any given operating condition is most conveniently found by trial, the minimum effective wall height being that with which no significant build-up occurs on the reactor surface around the combustion zone.

The minimum effective initial velocity of the jet stream in any one instance depends chiefly upon the diameter of the reactor, the length of the reactor, and the average diameter of the oversized particles entrained in the jet stream. This minimum effective velocity is likewise most conveniently found by trial, a preferred initial velocity being that at which sufficient particles are projected against the end of the reactor with scouring force to keep it clear of pigment deposits. However, the invention in its broadest aspect does not depend on the use of such high initial velocity as it is feasible to remove such upper incrustations by scrapers. Moreover, it is within the scope of the invention to operate the reactor for a period of time at lower jet velocities, permitting incrustations of titanium dioxide to form on the upper part of the reactor, and then to operate the reactor at high jet velocity until the incrustations have been scoured off.

The particles which overflow from the cascading wall into vent pipe 6 (or which are swept therethrough by the exiting gaseous stream) are replaced intermittently or, preferably, continuously. The replacement particles may be introduced as part of the titanium tetrachloride-oxygen combustion mixture through conduits 19 and 15, as shown in the drawing, but it is generally simpler to introduce them from the top through conduit 7 and this method is consequently preferred. The temperature of the particles returned should conform to the requirements of the process. When the particles are introduced from above they may be introduced at room temperature so as to provide cooling in the upper part of the reaction space. In types of combustion calling for auxiliary heat the particles may be introduced hot.

It is within the scope of the invention to introduce the titanium tetrachloride and oxygen separately, as adjacent jets, which mix within the reaction zone.

The replacement particles are advantageously the oversized particles recovered from the reactor from which the largest size fractions are removed to maintain the average size and total volume of the particles in the reactor substantially constant. If desired, the replacement particles may be oversized titanium dioxide particles which have been crushed, or may be other inert refractory materials, for example silica or alumina with or without a coating of titanium dioxide. We prefer to employ recycled oversized particles because these particles are spherical and hence cascade easily, and being essentially pure titanium dioxide formed by deposition of titanium dioxide on smaller titanium dioxide particles introduce no impurities.

Our evidence to date is that particles finer than about 65 mesh have too little momentum to be effective as scouring agents, and that particles larger than about 10 mesh tend to remain static at the bottom of the reactor. Accordingly, we prefer to return to the reactor particles in the −10 +65 mesh range and to send the remainder to chlorination.

The jet stream is substantially composed of titanium tetrachloride and oxygen as the principal pigment-producing components but may contain such additional components as have heretofore been employed in the manufacture of titanium dioxide by combustion of titanium halides. Thus the gas may contain minor amounts of aluminum trichloride, silicon tetrachloride, antimony trichloride and chromium chloride to modify the properties of the pigment produced. Furthermore, the gas may contain nitrogen, one or more of the noble gases, carbon dioxide or other inert gas as diluent to moderate the reaction and may contain minor amounts of water vapor, carbon monoxide, hydrogen, hydrocarbons, ethers, esters, etc., as nucleating agents or to supply supplementary heat.

In practice we have found it readily feasible to produce high quality pigment by the use of titanium tetrachloride and oxygen alone or in admixture with a minor amount of aluminum chloride as rutile promoter.

It is within the scope of the invention to introduce each of the gaseous components separately either through concentric orifices or through orifices placed in close juxtaposition. In either event the several streams combine so that as they react they form essentially one jet stream. It is a paticular advantage of the invention, however, that all of the gases may be pre-mixed and supplied to the reactor as a single homogeneous reaction mixture. The gas is supplied to the reactor at a temperature below its reaction point (approximately 700° C.) and preferably below 500° C. and the speed of the gaseous stream necessary to form a jet is substantially in excess of the speed of flame propagation therethrough. As a result there is little tendency for titanium dioxide incrustations to form at the orifice exit.

The invention will be further described by the examples which follow. These examples illustrate the invention and are not to be construed as limitations thereon.

*Example 1*

The following illustrates the preparation of titanium dioxide pigment in a vented reactor by burning titanium tetrachloride with oxygen through a reaction zone bounded by a wall of downwardly cascading incandescent oversized titanium dioxide particles. In the process the combustion gas is admitted vertically upwardly as a jet stream having an initial velocity sufficient to project at least part of the oversized particles against the top of the reactor with scouring force.

The apparatus used corresponded to that shown in FIGURE 1 except that cooling rod 14 was omitted. The reactor (the tubular area defined by the firebrick) had an inside diameter of 6″ and was 25″ high (from the tip of the base inlet orifice to the cement lining of the cap). The base plug containing the main gas inlet tube and the side carbon monoxide supply tube were ½″ in diameter and the tube extending vertically downwardly through the cap for charging oversized titanium dioxide particles was ¾″ in diameter. The ratio of the diameter of the reactor to the diameter of the inlet orifice was thus 12:1. The discharge tube was 1.5″ in inside diameter; its center line intersected the wall of the reaction space 16.5″ above the level of the $TiCl_4$—$O_2$ inlet orifice. The firebrick was surrounded by 9″ of insulating brick and contained electrical heaters and thermostats.

The apparatus was slowly pre-heated to 800° C. by the electric heaters. There were then added 12 lb. of oversized titanium dioxide particles at room temperature having the following screen analysis:

| Mesh (standard Tyler): | Percent by weight |
|---|---|
| +14 | 16.5 |
| −14 +20 | 44.4 |
| −20 +28 | 24.5 |
| −28 +35 | 9.4 |
| −35 +65 | 4.5 |
| −65 | 0.6 |
| Total | 99.9 |

Heating was continued by admitting $N_2$—$O_2$ through the lower orifice and CO through the side orifice; the rate of admission of the gases was sufficient to keep the oversized titanium dioxide particles in motion without carrying them out of the reactor. The interior was viewed by removing tube 7 and sighting through the cap. When the temperature reached 1200° C. the feed to the lower orifice was then switched to a homogeneous mixture of $TiCl_4$—$O_2$ (1:1.1 molar ratio) at 300° C. containing 2% of $AlCl_3$ on the weight of $TiCl_4$ and the flow of CO—$O_2$ was adjusted to maintain the bed temperature as shown by thermocouple at 1200° C. The speed of the mixture was adjusted to 400 liters per minute (N.T.P.), equivalent to an actual speed through the orifice of about 120 meters per second at 300° C., and the reaction gas burned as a jet stream surrounded by a wall of downwardly cascading oversized titanium dioxide particles.

During the run, recycled oversized solids corresponding to those initially added and having a temperature less than 250° C. were added through the top orifice at the rate of ⅔ lb./minute and oversized particles were swept from the reactor at the rate of 1 lb./minute by the gaseous suspension of pigmentary titanium dioxide leaving through the discharge end. A materials balance calculation made at the end of the run showed that this rate of addition was sufficient to keep the volume of oversized solids in the reactor substantially constant.

The run was continued for four hours. At the end of that time 160 lbs. of oversized particles had been added to the reactor, 238 lbs. of oversized particles had been discharged therefrom, 410 lbs. of $TiCl_4$ (containing 10 lbs. of $AlCl_3$) had been burned, and 95 lbs. of titanium dioxide pigment was recovered having the satisfactory tinting strength of 1620 $Br_3$, as determined by the National Lead Co. method.

The apparatus was cooled and inspected. The interior was substantially free from titanium dioxide incrustations and evidently could have been operated indefinitely.

Calculations showed that 55.4% of the titanium tetrachloride was converted to pigmentary titanium dioxide. The remainder was converted to oversized particles, at the rate of about ⅓ lb./minute.

The velocity of the jet stream was sufficient to project a sufficient proportion of the oversized particles against the upper part of the reactor with scouring effect to remove titanium dioxide incrustations as fast as formed. The major part of the particles dropped back to reform the walls of the crater in which the titanium tetrachloride was oxidized, and the remainder were swept from the reactor by the gaseous suspension of titanium dioxide.

*Example 2*

The procedure of Example 1 was repeated except that the combustion gas contained 1% of aluminum chloride based on the weight of the titanium tetrachloride. Good quality pigment was obtained without evidence of pigment build-up in the reactor.

*Example 3*

The procedure of Example 1 was followed except that the titanium tetrachloride was supplied to the reaction zone as an atomized liquid spray fed by a pipe running through cap 21 of the reactor and terminating at orifice 4a which was slightly enlarged to hold the atomizer. The temperature of the titanium tetrachloride was 90° C. and the temperature of the oxygen was 300° C.

A larger amount of CO was required than for Example 1 because of the cooling action of the liquid $TiCl_4$.

Pigment of satisfactory quality was obtained without formation of titanium dioxide deposits in the reactor. Evidently the droplets volatilized and formed a unitary stream with the surrounding oxygen which developed velocity and underwent combustion in substantially the same way as the gaseous stream of Example 1.

I claim:
1. A process for the manufacture of titanium dioxide pigment which comprises burning titanium tetrachloride with oxygen substantially vertically upwardly as a jet stream through a reaction zone bounded by a fluid wall of downwardly cascading incandescent oversized titanium dioxide particles whereby titanium dioxide pigment is formed substantially out of contact with fixed surfaces.

2. A process according to claim 1 wherein said oversized titanium dioxide particles are substantially spherical.

3. A process according to claim 1 wherein said oversized titanium dioxide particles are formed in said reaction zone by deposition of titanium dioxide upon smaller titanium dioxide particles.

4. A process for the manufacture of titanium dioxide pigment which comprises introducing titanium tetrachloride and oxygen from the inlet end of a vertical reactor having a lower reagent inlet end and an upper product discharge end as a jet stream through a reaction zone in said reactor bounded by a fluid wall of countercurrently moving incandescent oversized titanium dioxide particles, said jet stream having velocity sufficiently fast to entrain oversized incandescent titanium dioxide particles from a lower portion of said wall and to sweep pigmentary titanium dioxide particles through the discharge end of said reactor, whereby said titanium tetrachloride and oxygen are uniformly heated to ignition temperature and pigmentary titanium dioxide is formed substantially out of contact with fixed surfaces.

5. A process according to claim 4 wherein the titanium tetrachloride and oxygen each enter said reaction zone at a temperature below 500° C.

6. A process according to claim 4 wherein the titanium tetrachloride and oxygen are admitted to said reaction zone as a preformed homogeneous combustion mixture having a temperature below 500° C.

7. A process according to claim 4 wherein the entrained oversized particles are carried up sufficiently fast to project them with scouring force against discharge end of the reactor thereby removing titanium dioxide incrustations therefrom.

8. A process for the manufacture of titanium dioxide pigment, which comprises burning titanium tetrachloride and oxygen upwardly in a vertical reactor having a lower reagent inlet and a product discharge end as a jet stream through a reaction zone bounded by a fluid wall of downwardly cascading incandescent settled oversized titanium dioxide particles, whereby pigmentary titanium dioxide is formed substantially out of contact with stationary surfaces, said jet stream having an initial velocity sufficiently fast to entrain oversized incandescent titanium dioxide particles from a lower part of said reaction zone and to project said particles against said discharge end, whereby any adherent titanium dioxide is scoured therefrom.

9. A process according to claim 8 wherein at least part of said oversized particles are returned to said reactor at a temperature less than 250° C.

10. A process according to claim 8 wherein oversized titanium dioxide particles are removed from the reactor at sufficient rate to maintain the volume of oversized titanium dioxide particles in said reactor substantially constant.

References Cited in the file of this patent

UNITED STATES PATENTS

| | | |
|---|---|---|
| 2,367,118 | Heinen | Jan. 9, 1945 |
| 2,786,280 | Gishler et al. | Mar. 26, 1957 |
| 2,805,921 | Schaumann | Sept. 10, 1957 |
| 2,828,187 | Evans et al. | Mar. 25, 1958 |
| 2,899,278 | Lewis | Aug. 11, 1959 |

FOREIGN PATENTS

| | | |
|---|---|---|
| 726,250 | Great Britain | Mar. 16, 1955 |

UNITED STATES PATENT OFFICE
CERTIFICATE OF CORRECTION

Patent No. 3,022,137                              February 20, 1962

Earl W. Nelson

It is hereby certified that error appears in the above numbered patent requiring correction and that the said Letters Patent should read as corrected below.

Column 1, lines 29, 40 and 56, for "incrustrations" read -- incrustations --; line 65, for "existing" read -- exiting --; column 2, line 12, for "feed" read -- feeder --; line 58, for "1100°" read -- 1000° --; column 4, line 34, for "paticular" read -- particular --.

Signed and sealed this 4th day of December 1962.

(SEAL)
Attest:

ERNEST W. SWIDER                                    DAVID L. LADD
Attesting Officer                                      Commissioner of Patents

Notice of Adverse Decision in Interference

In Interference No. 96,001 involving Patent No. 3,022,137, E. W. Nelson, COMBUSTION OF TITANIUM TETRACHLORIDE WITH OXYGEN, final judgment adverse to the patentee was rendered July 8, 1969, as to claim 1.

[*Official Gazette March 17, 1970.*]